(12) United States Patent
Firatli

(10) Patent No.: US 6,416,602 B1
(45) Date of Patent: Jul. 9, 2002

(54) METHOD OF PRODUCING A DISPOSABLE PROTECTIVE CAP FOR AN INFRARED RADIATION THERMOMETER

(75) Inventor: Ahmet Firatli, Wiesbaden (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 09/254,602

(22) PCT Filed: Aug. 16, 1997

(86) PCT No.: PCT/EP97/04485

§ 371 (c)(1),
(2), (4) Date: Aug. 1, 2000

(87) PCT Pub. No.: WO98/10257

PCT Pub. Date: Mar. 12, 1998

(30) Foreign Application Priority Data

Sep. 5, 1996 (DE) .......................................... 196 35 962

(51) Int. Cl.[7] .............................................. B32B 31/16
(52) U.S. Cl. ................................. 156/73.1; 156/244.13; 156/272.8; 156/308.2
(58) Field of Search ................................ 156/73.1, 242, 156/243, 244.11, 244.13, 272.2, 272.8, 308.2

(56) References Cited

U.S. PATENT DOCUMENTS

| | | | | |
|---|---|---|---|---|
| 4,662,260 A | * | 5/1987 | O'Hara et al. ................... | 128/9 |
| 5,179,936 A | * | 1/1993 | O'Hara et al. ................... | 128/9 |
| 5,293,862 A | * | 3/1994 | O'Hara et al. ................... | 128/9 |
| 5,479,931 A | * | 1/1996 | Mooradian ................... | 128/664 |
| 5,516,010 A | * | 5/1996 | O'Hara et al. ............... | 600/121 |

FOREIGN PATENT DOCUMENTS

| | | |
|---|---|---|
| EP | 0 201 790 A2 | 11/1986 |
| WO | WO 95 13745 A1 | 5/1995 |

* cited by examiner

Primary Examiner—James Sells
(74) Attorney, Agent, or Firm—Morgan, Lewis & Bockius LLP

(57) ABSTRACT

The art knows of methods of manufacturing disposable protective covers (1) that are seatable onto an infrared radiation thermometer suitable for introduction into a body cavity, in particular upon an ear canal temperature probe. To manufacture such a disposable protective cover (1) economically, a tubular body portion (2) is produced by extruding molten plastic following which the one end of the body portion (2) is closed with the window film (11).

17 Claims, 2 Drawing Sheets

METHOD OF PRODUCING A DISPOSABLE PROTECTIVE CAP FOR AN INFRARED RADIATION THERMOMETER

This invention relates to a method of manufacturing a disposable protective cover for an infrared radiation thermometer suitable for introduction into a body cavity, in particular for an ear canal temperature probe, in which a tubular body portion is formed of plastic material, whose one end is open and whose opposite end is closed by a window film that is transparent to infrared radiation.

Infrared radiation thermometers are widely used on persons for measuring their body temperature. Typically, such a radiation thermometer includes a housing with a window admitting radiation, internal optical components and an infrared sensor associated with an evaluation unit. The window admitting radiation closes off the interior of the housing of the radiation thermometer, thereby protecting the optical components and the sensor from contamination and destruction. As an additional protection, disposable protective covers of the type initially referred to are seated onto the forward end of the thermometer to protect the window during storage of the thermometer for one purpose, and to be exchanged for reasons of hygiene for another purpose in cases where such a thermometer is used by different persons.

Protective covers of the type initially referred to are described, for example, in EP 0201 709 B1. The disposable speculum as described in this printed specification is fitted over the ear canal probe of a tympanic thermometer that is sensitive to infrared radiation. This disposable speculum has a membrane made of polypropylene or polyethylene which is transparent to infrared radiation. The body portion carrying the membrane is an injection-molded part having the transparent membrane, which is manufactured as a thin film, thermally connected with the body portion's edge area bounding the window opening.

A further protective cover for a thermometer insertable into an ear canal is described in U.S. Pat. No. 5,293,862. To manufacture this protective cover, a tubular body portion is first formed by injection molding, and a membrane is attached to the one open end. For the manufacture of such a disposable protective cover, a mold is provided which has a cavity corresponding to the body portion. The mold is designed with separable parts in the region of the edge where the window film is to be arranged, thus enabling a window film to be placed into this parting plane prior to each injection molding operation. Injection molded onto the outside of the window film is an annular member arranged in an extension of the wall of the body portion, so that upon completion of the injection molding operation the window film is retained between the body portion and this outer ring.

On the basis of the prior art referred to in the foregoing and the known methods of manufacturing disposable protective covers for infrared radiation thermometers, it is an object of the present invention to provide a method which enables such disposable protective covers to be produced economically and which, in addition, offers a wide range of variation possibilities in respect of adapting the material to the properties required from such a protective cover.

Based on a method of manufacturing a disposable protective cover of the type initially referred to, this object is accomplished in that the body portion is produced by extruding molten plastic and subsequently closing the one end of the body portion with the window film. The extrusion process enables the body portion to be manufactured economically. Further, it is possible to vary the length of the body portion in accordance with the requirements, that is, extruded parts can be cut to the desired length without any change to the extrusion device. Moreover, it is possible to profile the body portion which involves a sleeve-shaped part, that is, reinforcement ribs or other axially extending projections or recesses, for example, can be injection-molded onto the inside. Finally, another variation possibility is provided in that the body portion can be extruded from different materials in respect of its cross-section normal to its axis, for example, from a firmer material on the inside of the body portion, thereby providing a support body engaging the measuring tip of a radiation thermometer, and from a softer material on its outside which conforms itself snugly to the ear canal. After such a body portion is manufactured by extrusion, its one open end is closed with a window film which is transparent to the relevant infrared measuring radiation.

As mentioned in the foregoing, according to claim 2 preferably the inside of the body portion, as seen in cross-section, that is, the radially inward region with which the disposable protective cover is seated onto the measuring end of the infrared radiation thermometer, is extruded from a firmer material, whereas the radially outward region is extruded from a softer material, with preferably the outward region being extruded from a soft foamed material. Foamed materials suitable for this purpose are polyethylene (PE), polypropylene (PP) or polystyrene (PS). Such foamed materials should be provided with closed pores to prevent contaminants from depositing in the pores of the foamed material not only during storage of these disposable protective covers, but also when they are being used.

The inward region of the protective cover or the body portion is extruded from the corresponding materials mentioned in the foregoing also with respect to the foamed material, that is, from polyethylene (PE), polypropylene (PP) or polystyrene (PS). The hardness of the material is adjusted by suitable softeners. To impart a high stiffness to the body portion while yet making it yielding so as to enable it to be readily seated onto the measuring end of a radiation thermometer, in particular also with a view to extruding such a protective cover in the form of a tubular body portion of approximately uniform diameter normal to its axis, it may be of advantage to profile the inward region of the tubular body portion. This profiling preferably takes the form of axially extending ribs. Such ribs then have their free longitudinal edges which extend towards the axis in engagement with the measuring end of the radiation thermometer. In cases where they are of a correspondingly thin and flexible configuration, they may engage the contour of the radiation thermometer also when this contour extends conically. Further, a free space or air cushion is formed between adjacent ribs which imparts resilience and flexibility to the disposable protective cover when, seated onto the forward end of a radiation thermometer, it is introduced into an ear canal. In particular in combination with a layer of foamed material on the outside of the disposable protective cover as mentioned previously, a high usage comfort can be accomplished with such a protective cover.

Moreover, the formation of profiles such as ribs on the one hand and the selection of different materials on the other hand, that is, a firmer material on the inside of the protective cover and a softer material on the outside of the protective cover, enable a thermal decoupling to be accomplished between the inside which fits over the thermometer and the outside which engages the ear canal.

A variety of possibilities offer themselves to close off the one free end of the extruded body portion with a window film. The window film should be relatively thin, that is, preferably of a thickness in the range of between 0.005 mm and 0.05 mm with polyethylene being the preferred material for such a window film. To obtain very thin window films, a process has proven to be advantageous in which the window film is formed directly from molten plastic or a plastic solution. For this purpose, the free end of the body portion which is to be closed is immersed in such a solution so that a film is stretched over the edges of the body portion, forming the window film following hardening.

Very good results are obtained if the molten plastic is comprised of essentially low-molecular polyethylene with wax and oil additives. Low-molecular polyethylene can be set in a highly liquid state precisely by the addition of wax and/or oils and by the action of heat.

As an alternative to molten plastic in the form of low-molecular polyethylene, the molten plastic may be comprised of substantially polystyrene dissolved in a solvent as, for example, acetone.

As an alternative to the formation of a window film from molten plastic, it is possible to close the body portion by affixing a separate window film. Suitably held in stretched fashion, such a window film can be adhered to the edge of the body portion by means of an adhesive. Preferably, however, the separate window film is secured to the forward end of the body portion by welding or by exposure to ultrasound.

A further proven method of affixing the window film to the body portion is provided by laser beam application, preferably in the infrared range. Because the window film is invariably transparent to infrared radiation, laser radiation in the infrared range passes through the film, causing the material of the body portion to melt. In addition, the use of color pigments enables the plastic material of the body portion to be designed to be infrared absorbing. With this process, the window film is not damaged as it is secured to the body portion. The formation of a uniform melt beneath the film and thus good adhesion can be obtained. It is also possible to affix the film by means of the application of microwave energy when, in order to the generate the necessary heat in the area of the joint, humidity is introduced into this area or the edge is wetted with water. Both laser radiation and microwaves can be adjusted to defined values in respect of the generation of heat and the penetration of heat into the materials, so that only defined areas are heated for attachment of the window film.

Further details and the features of the method of the present invention will be described in more detail in the following with reference to the accompanying drawings.

Figure 2:
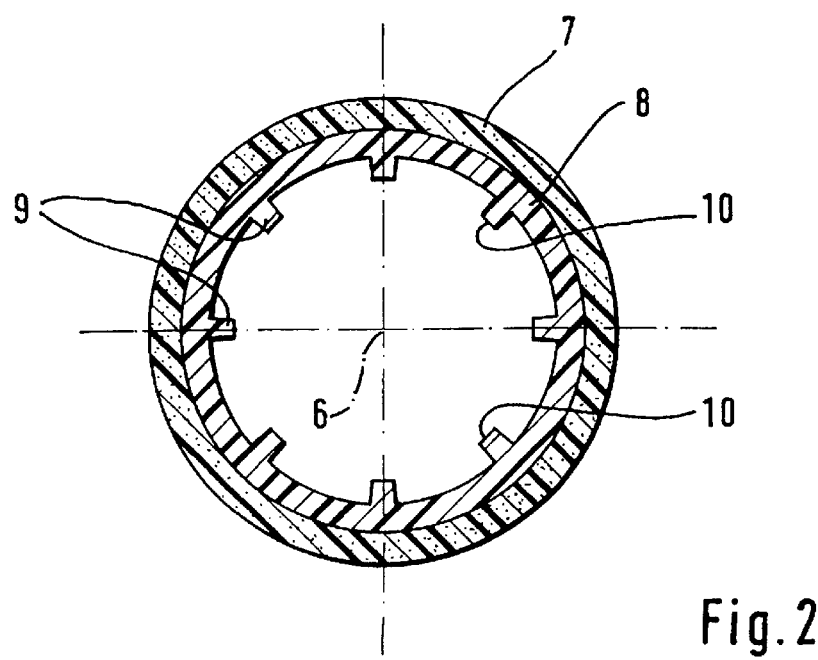
FIG. 2 is a sectional view of the cover of FIG. 1, taken along the line II—II of FIG. 1.

A disposable protective cover 1 of the type illustrated in FIG. 2 in section includes a tubular or sleeve-shaped body portion 2 having its upper free end 3 closed by an infrared window 4 formed of a thin film that is transparent to infrared radiation.

Such a disposable protective cover 1 is placed onto the measuring end of an infrared radiation thermometer not illustrated in more detail, so that the tip of the thermometer is received in the interior 5 of the disposable protective cover 1. The clinical thermometer with its protective cover 1 seated in place is then introduced into a user's ear canal. Infrared radiation emitted from the tympanic membrane and from the ear canal enters the measuring end of the radiation thermometer through the window 4 and is directed to an infrared sensor inside the radiation thermometer. The temperature increase produced in the infrared sensor results in an electric output voltage from which the radiation temperature is derived.

The protective cover 1 is a disposable part which, following temperature measurement, is removed from the radiation thermometer to be replaced with a new, unused protective cover 1 for taking another, for example, another person's temperature.

Because the protective cover 1 is utilized as a disposable part, economy of manufacture is essential, however with due consideration of the need for the window 4 to possess the properties suitable for passage of the infrared radiation to the infrared sensor of the associated radiation thermometer, which include adequate thinness on the one hand and tautness on the other hand, being held in stretched fashion on the upper free end 3 of the sleeve-shaped molded body 2.

Figure 1:
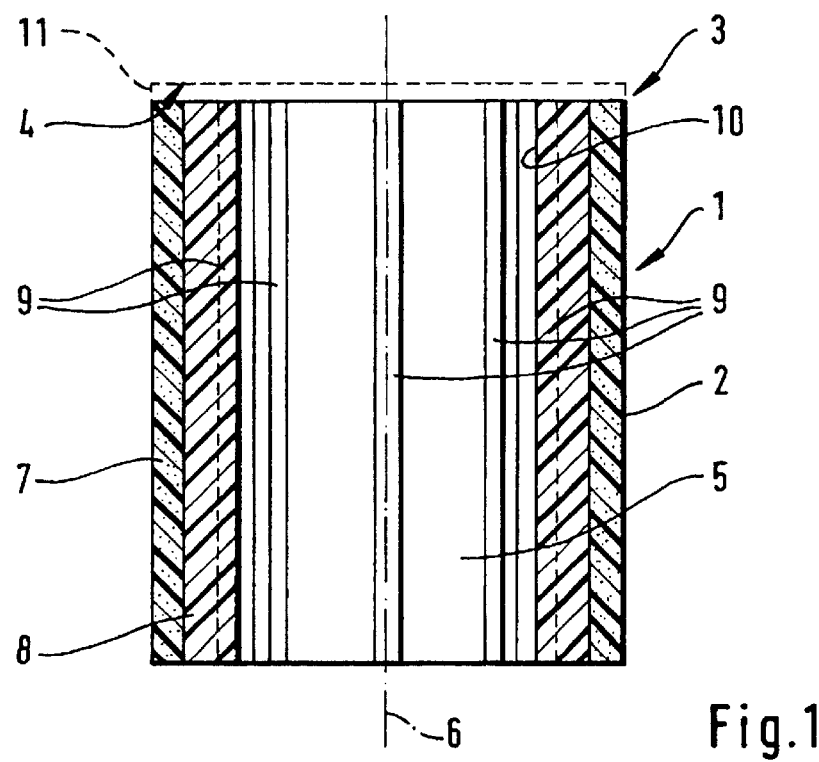
FIG. 1 is a longitudinal sectional view of a disposable cover with extruded body portion according to the present invention, taken along the axis.

The body portion 2 is an extruded part of uniform diameter along its axis 6, as shown in FIGS. 1 and 2. During the process of extruding the body portion 2, different materials are fed to the extruding nozzle in the radially inward zone and in the radially outward zone, thus enabling the material properties of the body portion 2 to be defined to satisfy the demands placed on such a protective cover. This means that the outward region 7 is extruded from a softer, that is, foamed, material, whereas the radially inward region 8 is extruded from a firmer material. For the outward region 7, soft foamed materials made of polyethylene (PE), polypropylene (PP) or polystyrene (PS) are suitable. For the inward region 8, polyethylene (PE), polypropylene (PP) or polystyrene (PS) are equally employed with preference. The hardness degrees of these materials an be adjusted by appropriate softeners. Preferably, the outward and inward regions 7, 8 are extruded from materials of like character, that is, either from polyethylene, polypropylene or polystyrene. Because the outward region 8 is foamed, the extruded body portion 2 yieldingly engages the ear canal in a manner pleasant for the user of a thermometer equipped therewith.

To increase the stiffness of the body portion while yet providing it with a defined flexibility, projections 9 extending in the direction of the axis 6 are extruded on the inside of the body portion, protruding from the inner surface of the body portion by an amount of preferably 1 to 3 mm, approximately. These projections 9 have -their free ends 10 in engagement with the outside of a radiation thermometer onto which the disposable protective cover 1 is fitted.

Conventionally, the measuring tips of such radiation thermometers extend conically towards their end, so that it is precisely with these projections 9 or the areas of the body portion 2 lying between them that a high flexibility is obtained, while on the other hand a firm engagement of the disposable protective cover 1 with the measuring tip of a radiation thermometer is ensured. Such mated engagement of a disposable protective cover is customarily accomplished in that the disposable protective cover 1 has in its interior 5 a shape corresponding to the end of the radiation thermometer on to which the disposable protective cover 1 is to be seated.

As FIG. 2 shows, a total of eight projections 9 are provided which are equidistantly spaced from each other in the interior 5 on the circumference, that is, with reference to the axis 6 of the body portion 2, adjacent projections 9 are arranged at a relative distance of 45°. If necessary with a view to adjusting the flexibility of the disposable protective cover, a number of projections 9 lower or higher than the number illustrated in FIG. 2 may be utilized, and in the latter case it is desirable that the projections be very thin, that is, of a laminar configuration, for maintaining adequate flexibility.

Figure 3A:
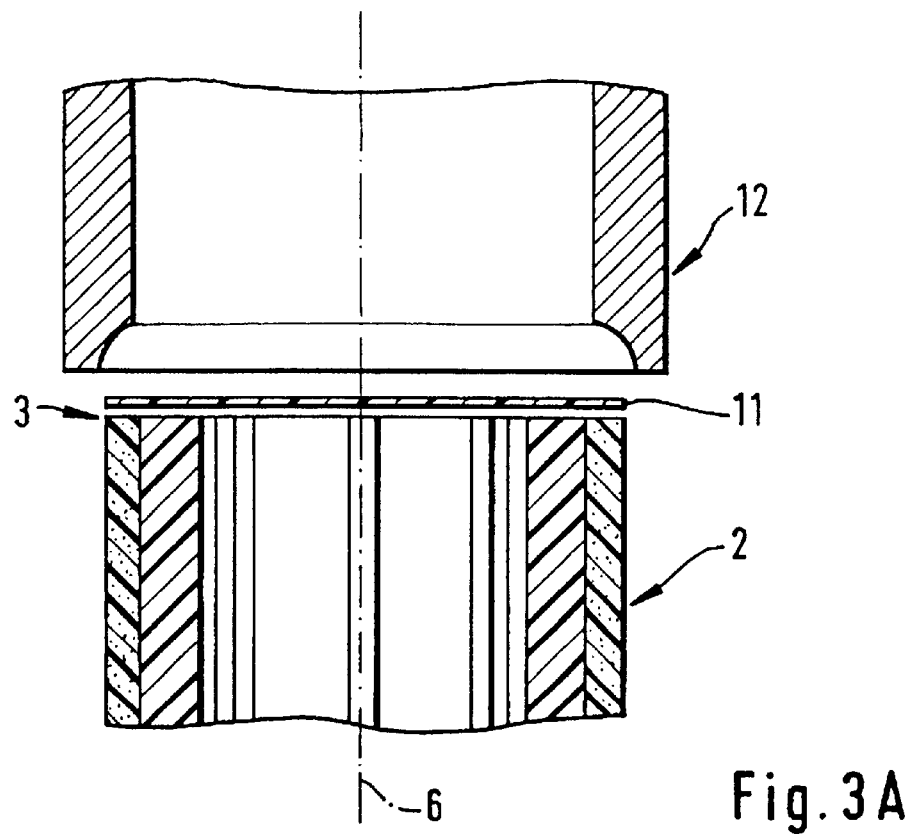
FIG. 3A is a schematic longitudinal sectional view of the upper end of a body portion for a disposable protective cover having a separate window film that is joined to the edge of the body portion by means of ultrasonic welding.
Figure 3B:
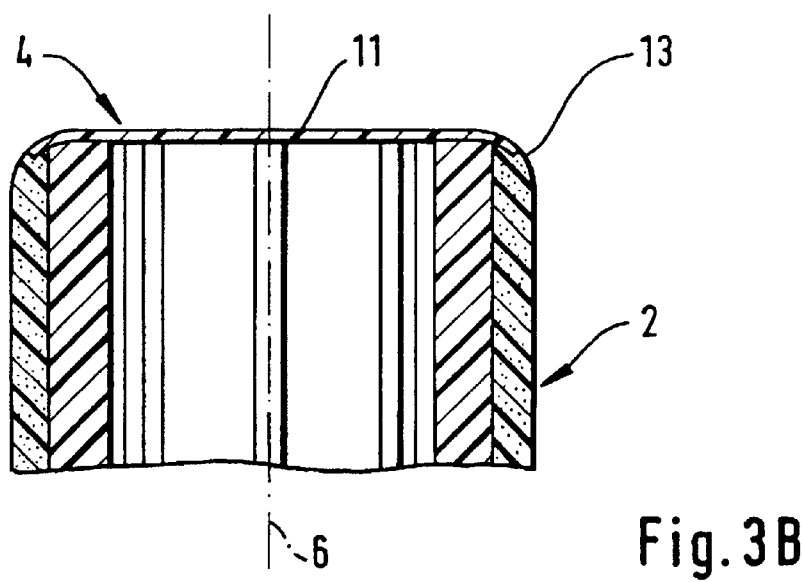
FIG. 3B is a view of the forward end of the body portion of FIG. 3A with the window film welded thereto.

To obtain the window 4, a window film 11 illustrated in FIG. 3A as a separate component is attached to the body portion 2. A preferred method of securing the window film 11 to the free end 3 of the body portion 2 is Ultrasonic welding. To this end, the window film 11 is deposited onto the free end 3 of the body portion 2, and the ultrasonic head 12 is placed onto the outside of the window film 11 which is urged against the free end 3 of the body portion 2. Then the area of the joint, that is, the area of the free end, is exposed to ultrasonic energy from the ultrasonic head 12, so that a defined amount of heat is produced for welding or coalescence of the window film 11 with the free end 3 of the body portion 2. As becomes apparent from FIG. 3A, the ultrasonic head 12 is provided with a rounded contour, as a result of which welding of the window film 11 produces a chamfer 13 on the end of the body portion 2, thereby eliminating any sharp edges on the finished disposable protective cover 1 which could be perceived as unpleasant when the user introduces the radiation thermometer with the protective cover seated thereon into an ear canal.

What is claimed is:

1. A method of manufacturing a disposable protective cover (1) for an infrared radiation thermometer suitable for introduction into a body cavity, in particular for an ear canal temperature probe, in which a tubular body portion (2) is formed of plastic material, whose one end is open and whose opposite end is closed by a window film (11) that is transparent to infrared radiation, characterized in that the tubular body portion (2) has its radially outward region (7), when seen in cross-section, extruded from a material that is softer than that of the radially inward region (8).

2. The method as claimed in claim 1,
   characterized in that the outward region (7) is extruded from a soft foamed material.

3. The method as claimed in claim 2,
   characterized in that the soft foamed material is polyethylene (PE), polypropylene (PP) or polystyrene (PS).

4. The method as claimed in claim 1,
   characterized in that the inward region (8) is extruded from polyethylene (PE), polypropylene (PP) or polystyrene (PS).

5. The method as claimed in claim 1,
   characterized in that the radially inward region (8) of the tubular body portion (2) is profiled.

6. The method as claimed in claim 1 or 5,
   characterized in that axially extending ribs or projections (9) are formed on the radially inward region (8) of the tubular body portion (2).

7. The method as claimed in claim 1,
   characterized in that the window film (11) is formed by immersing the one end of the body portion (2) in molten plastic.

8. The method as claimed in claim 7,
   characterized in that the molten plastic is essentially comprised of low-molecular polyethylene with wax and oil additives.

9. The method as claimed in claim 7,
   characterized in that the molten plastic is essentially comprised of polystyrene dissolved in a solvent.

10. The method as claimed in any one of the claims 7 to 9,
    characterized in that the window film (11) is formed with a thickness in the range of between 0.005 mm and 0.05 mm.

11. The method as claimed in claim 1,
    characterized in that the one end of the body portion (2) is closed by affixing a separate window film (11).

12. The method as claimed in claim 11,
    characterized in that the separate window film (11) is attached to the one end of the body portion (2) by adhesive bonding.

13. The method as claimed in claim 11,
    characterized in that the separate window film (11) is attached to the one end of the body portion (2) by welding.

14. The method as claimed in claim 11 or 13,
    characterized in that the separate window film (11) is welded to the one end of the body portion (2) by the application of ultrasound.

15. The method as claimed in claim 11 or 13,
    characterized in that the separate window film (11) is welded to the one end of the body portion (2) by the application of a laser beam, preferably in the infrared range.

16. The method as claimed in claim 11 or 13,
    characterized in that the separate window film (11) is welded to the one end of the body portion (2) by the application of microwaves.

17. The method as claimed in claim 1,
    characterized in that the window film (11) is formed of polyethylene (PE) or polypropylene (PP).

* * * * *